Oct. 7, 1941.    C. J. DAVIES    2,258,240
FORMING MEMBER
Filed June 26, 1939    2 Sheets-Sheet 1
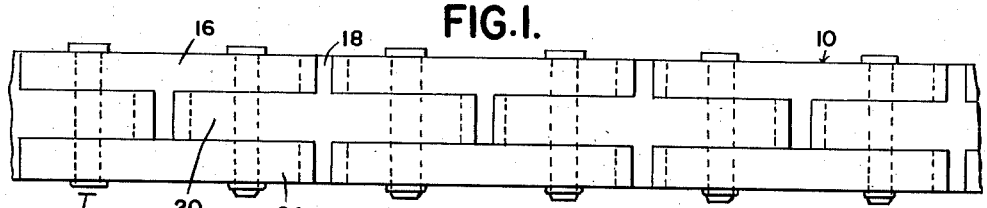
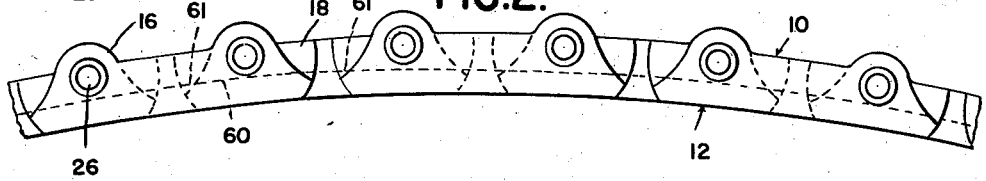
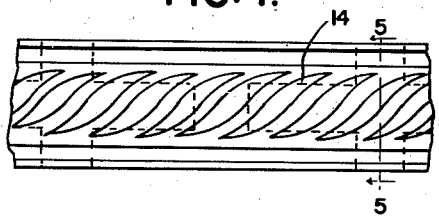
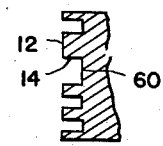
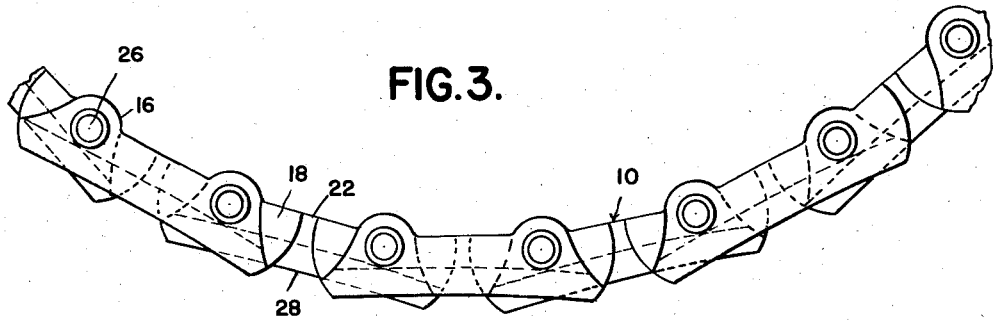
INVENTOR.
CLARENCE J. DAVIES
BY Whittemore, Hulbert & Belknap
ATTORNEYS Oct. 7, 1941.   C. J. DAVIES   2,258,240
FORMING MEMBER
Filed June 26, 1939   2 Sheets-Sheet 2
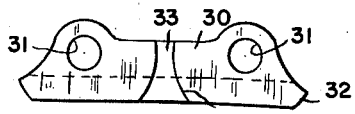
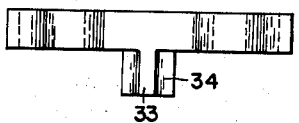
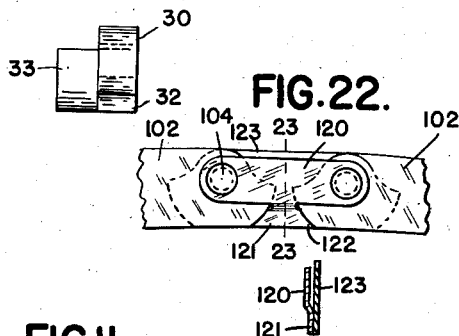
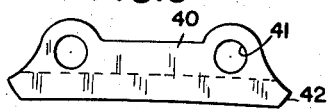
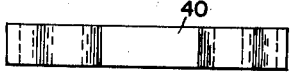
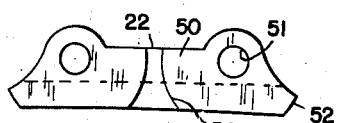
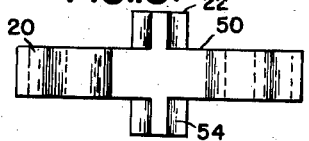
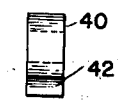
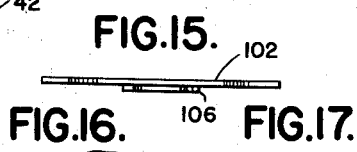
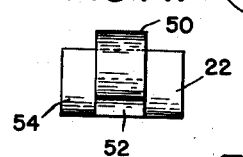
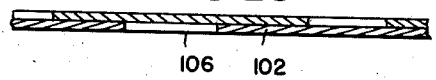
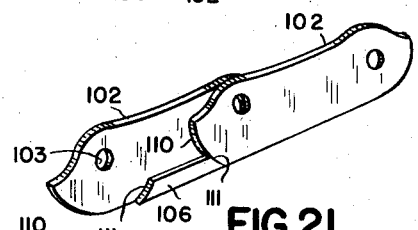
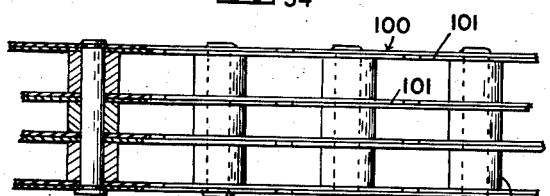
INVENTOR.
CLARENCE J. DAVIES
BY Whittemore, Hulbert & Belknap
ATTORNEYS Patented Oct. 7, 1941

2,258,240

UNITED STATES PATENT OFFICE 2,258,240

FORMING MEMBER

Clarence J. Davies, Detroit, Mich., assignor to National Automotive Fibres, Inc., Detroit, Mich., a corporation of Delaware Application June 26, 1939, Serial No. 281,276

7 Claims. (Cl. 154—1)

The present invention relates to a forming member and more particularly to a chain forming member adapted to be employed for decoration of cloth on a machine of the type disclosed in my co-pending application, Serial No. 245,330, filed December 12, 1938, entitled "Decoration."

In the co-pending application referred to, the forming member disclosed was a wire or metal band. While the forming member disclosed in the earlier application has proved to give eminently satisfactory results, it has been found, particularly with the adoption of more complicated designs, that more pressure is desirable than may advantageously be supplied through the metal wire or band referred to. I have accordingly developed a chain forming member which is adapted to cooperate with a heated drum in the manner set forth in the co-pending application.

In order that the pressure which is applied to the fabric being decorated shall be uniformly applied to the surface of the cloth, the links which go to make up the chain forming member are concave at their inner surfaces on a radius substantially equal to the radius of the drum with which they cooperate. In order to prevent pinching of the fabric in operation of the machine, individual links are provided with cooperating bearing portions of circular cross section.

With the foregoing general remarks in view, it is an object of the present invention to provide a chain having novel characteristics.

It is a further object of the present invention to provide a chain forming member characterized by the provision of a continuous curved surface.

It is a further object of the present invention to provide a chain, the links of which are so formed as to prevent pinching of the material as the individual links pivot relative to each other.

Other objects of the invention will be apparent as the description proceeds, and when taken in conjunction with the accompanying drawings, wherein:

Figure 1 is a plan view of a portion of a chain embodying the present invention;

Figure 2 is a side elevation of a portion of the chain;

Figure 3 is a side elevation of a portion of the chain, showing the same reversely bent as compared with Figure 2;

Figure 4 is a bottom plan view showing a decorative design applied to a portion of the chain;

Figure 5 is a section on the line 5—5, Figure 4;

Figure 6 is a side elevation of a portion of a link member;

Figure 7 is a top plan of the link portion shown in Figure 6;

Figure 8 is an end view of the portion of the link shown in Figure 6;

Figure 9 is a front elevation of other link portions adapted to cooperate with the link portions shown in Figures 6 to 8;

Figure 10 is a plan view of the link portion shown in Figure 9;

Figure 11 is an end view of the link portion shown in Figure 9;

Figure 12 is a front elevation of a link adapted to cooperate with the link portions shown in Figures 6 to 10.

Figure 13 is a plan view of the link shown in Figure 12;

Figure 14 is an end view of the link shown in Figure 12;

Figure 15 is a plan view of a link element employed in another embodiment of my invention;

Figure 16 is a front elevation of the link element shown in Figure 15;

Figure 17 is an end view of the link element shown in Figure 15;

Figure 18 is a plan view partly in section of a chain comprising the links shown in Figures 15 to 17;

Figure 19 is a front elevation of the chain shown in Figure 18;

Figure 20 is a section on the line 20—20, Figure 19; and

Figure 21 is a perspective showing the relationship between link elements in the chain shown in Figure 18.

Figure 22 is a fragmentary elevation of a portion of a somewhat different chain; and Figure 23 is a partial section on the line 23—23, Figure 22.

Referring first to the embodiment illustrated in Figures 1 to 13, I show a chain 10 which has an inner surface 12 presenting a smooth, uninterrupted, continuous concave circular surface when the links are arranged in a curve corresponding to the said surface. Preferably, this smooth continuous surface is provided with recesses 14 for the purpose of imparting corresponding raised embossments on a fabric which is compressed between the chain 10 and a heated drum.

It will be understood, of course, that the chain as first manufactured is preferably provided with the continuous smooth surface referred to, after which the decorative recesses are applied.

The chain 10 comprises alternate H-shaped links 16 and intermediate cross-shaped links 18. Each cross-shaped link is provided with relatively large arms 20 projecting in the general direction of the length of the chain, and smaller cross arms 22 arranged right-angularly thereto. The H-shaped links 16 as assembled are provided with parallel projecting arms 24. The parts are pivoted together by pivot pins 26, the arrangement being such that the relatively large projecting arms 20 of the cross-shaped links 18 are each received between a pair of parallel arms 24 of the H-shaped link 16.

For convenience in manufacture, I prefer to provide the H-shaped links in the form of two separate elements. Referring particularly to Figures 6 to 11, these elements have the same cross sectional shape, but one of them is provided with a short projection which is adapted to slidingly engage the cross member of the H-shaped link. The link portion 30, shown in Figures 6 to 8, is provided with a pair of apertures 31 for receiving the pins 26 previously referred to. The ends of the link portions 30 are rounded as indicated at 32, the portion 32 being preferably cylindrical and concentric with the axes of the apertures 31. An intermediate projection 33 is provided midway between apertures 31. The projection 33 extends substantially to the height of the link and is provided with curved surfaces 34. The surfaces 34 are preferably cylindrical and are concentric with the axes of the apertures 31. Furthermore, the radius of curvature of the surfaces 34 and 32 are the same.

A second link portion 40 is adapted to cooperate with the link portion 30 and is, as shown, of the same cross sectional shape. It is provided with apertures 41 adapted to be aligned in use with the apertures 31 previously referred to. It is further provided with rounded ends 42 which are preferably cylindrical and which are concentric with the axes of the apertures 41. The radius of curvature of the surfaces 42 is, of course, the same as the radius of curvature of the surfaces 32.

In Figures 12 to 14 I have illustrated cross-shaped link 50, adapted to cooperate with the composite link made up of the link elements 30 and 40. The link 50 has the same sectional elevation as the composite link referred to and is provided with apertures 51 for receiving the pins 26 previously referred to. It is in like manner provided with curved surfaces 52 at its ends, which are concentric with the axes of the apertures 51, and the radius of curvature of this surface is the same as the radii of curvature of surfaces 32, 34 and 42, as previously defined. The link 50 in addition is provided with two short arms 22, previously mentioned, each of which in turn is provided with concavely curved surfaces 54. The surfaces 54 are preferably cylindrical and are concentric with the axes of the apertures 51. They also are formed to the same radius as the other surfaces previously referred to.

Referring now to Figure 2, it will be observed that the H-shaped links 16 and the cross-shaped links 18 are interfitted in such a manner that the various curved surfaces previously referred to are brought into sliding engagement. In other words, end portions 32 and 42 of the H-shaped link 16 slidingly engage the surfaces 54 of the cross-shaped link. In like manner the end surfaces 52 of the cross-shaped link slidingly engage the curved surfaces 34 formed on the cross piece of the H-shaped link 16.

By reason of this cross sliding engagement between the various link elements, it will readily be seen that as the chain conforms to the curvature of a heated drum, a fabric which is included between the chain and the drum will not be pinched between relatively movable elements of the chain. The chain when reversely bent, as indicated in Figure 3, presents surface elements 28 which are substantially out of alignment, but as these surface elements 28 come into alignment to form the continuous smooth surface 12 shown in Figure 2, the close interfitting engagement between the cylindrically curved elements will prevent pinching of the fabric.

It will further be noted that the transverse surfaces 34, 42, 52 and 54 intersect the bottom of each link at a substantial angle. This permits the parts to match up with great exactness when the chain conforms to the curvature of the large drum.

The chain as thus far described is capable of applying very great pressure to the rotating drum, and may be employed without further modification to form a design which includes a smooth, uninterrupted band. Ordinarily, however, it is desired to impart arbitrary configurations to the fabric, and for this purpose I prefer to provide recesses indicated generally at 14 in the surface 12. In Figure 4 I have shown one type of design merely for purposes of illustration. It will be seen that the recesses are or may be formed partly in one link member and partly in another. It will be apparent that the recesses may be machined individually in the link members prior to assembly of the chain, or as is preferable in some instances and for some designs, they may be machined after complete assembly of the chain.

The operation which is to be performed by the present chain may well be briefly described at this point.

The fabric to be decorated has applied to its rear surface throughout the zone of decoration a thin strip or sheet of a rubber stock adapted to expand upon heating. This rubber stock is vulcanizable and the subsequent decorating process insures a secure permanent bond between the rubber and the cloth. The assembly of the rubber and cloth is advanced through the machine with the rubber in contact with a drum of relatively large diameter. The chain 10 is brought into contact with the outer or dress face of the cloth, pressing the same tightly against the heated drum. The application of heat to the rubber stock causes the same to swell, forcing the fabric up into the recesses 14.

In order to permit ready expansion of the fabric under the impulsion of the swelling rubber, the recesses 14 will, of course, be provided with sufficient depth to accommodate the height of riser to be formed. In addition, it is desirable to provide a vent at the top of the recess for the escape of gas and to prevent building up of gas pressure in the recess, which would prevent or retard the formation of the bead or riser element.

Referring again to Figure 2, I have indicated by the dotted line 60 the depth to which the recesses 14 are provided. It will be apparent that these recesses are of a depth sufficient to provide an opening indicated at 61 in each link element. In other words, the curved surfaces 32, 42 and 52 provided at the end of each link are of limited extent and are of lesser height than the depth of recesses 14.

I have illustrated in Figures 15 to 21 a somewhat different embodiment of my invention which, however, depends upon the same operating principles. In this modification, a chain 100 is composed of a plurality of separate parallel longitudinally extending linked portions 101. Linked portions 101 are made up of a plurality of individual, identical links 102, each provided with apertures 103 adjacent each end for the reception of pivot pins 104. Pivot pins 104 in addition carry spacing bushings 105 to retain the linked portions 101 in properly spaced relation.

It will be apparent that the chain 100 is adapted to form a plurality of (in a modification illustrated, four) parallel grooves across the fabric. Blowing of the rubber, as previously described, causes the formation of a bead or riser intermediate each groove formed by the linked elements 101. It will thus be seen that the chain 100 is adapted to form only a single design, whereas the chain 10 illustrated in Figure 1 may be provided with recesses to form a design of any nature desired.

The links 102 are preferably formed of sheet metal and may conveniently be formed by stamping. The elements are provided with a projection 106, which in the finished article is located at the side of the flat link 102. As will be readily apparent, the projection 106 may conveniently be formed in the stamping operation and then bent to the position shown in Figures 15 to 17.

In assembling the chain comprising the links 102, each successive link 102 is reversed with respect to its adjacent links. The relationship is best illustrated in Figure 21 in which it will be noted that the link 102 to the left is provided with a projection 106 extending to the front of the link, as seen in that figure. The link 102 at the right of Figure 21 has a right surface 110 which engages a correspondingly curved surface 111 on the projection 106. At the same time, it will be understood that the link 102 at the right in Figure 21 is provided on its rear surface, as seen in this figure, with a similar projection 106 which cooperates in like manner with the right-hand curved end surface of the link of the left-hand link 102.

It will be understood that as in the embodiment illustrated in Figures 1 to 14, the end surfaces 110 of the links 102 and the concavely curved surfaces 111 of the projections 106 are all concentric with the pin apertures 103 and are formed on the same radius. As a result, in this modification as in that previously described, pinching of the fabric is completely avoided and at the same time the continuous smooth inner surface of desired width is obtained when the link elements are arranged in a curve corresponding to the curvature of the drum.

In Figures 22 and 23 I illustrate a somewhat different embodiment. In this case, instead of forming the reversely folded projection 106, I employ a separate link element 120 which has a lower, laterally offset portion 121. Link elements 120 are provided alternately at opposite sides of plain links 102 in Figure 22, and portion 121 is offset an amount sufficient to cause it to line up with adjacent links. Portion 121 is of course provided with arcuate ends 122 to engage the correspondingly shaped ends of links 102.

In this modification, as in that shown in Figures 15 to 21, a continuous band having double the thickness of a link 102, or 120 is formed, and it will contact the curved surface throughout in a manner definitely avoiding pinching of cloth.

In all modifications it will be understood the inner or lower surface of each element is formed on a concave curve of large radius, the radius corresponding substantially to the radius of the drum. Also in all modifications the cylindrically curved transverse surfaces all intersect the bottom of the corresponding link at a substantial angle.

While I have found the chains disclosed herein as particularly useful for the purpose set forth, it will be understood that they are not so limited and may be employed wherever it is desired to employ a flexible member for applying large pressures over a substantial area to a curved surface. As will be evident in a proper case, it will be possible to provide the smooth continuous surface on the exterior of the chain, or in some instances both the inner and outer surface of the chain may be formed to provide smooth continuous concentric surfaces when the chain is disposed in the corresponding curve.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A fabric-embossing chain comprising flat sheet metal links pivoted together at their ends, and having end portions convexly curved concentrically with the adjacent pivot axis, said links being laterally staggered such that alternate links are coplanar, a separate plate pivoted at its ends to adjacent links at the opposite side of said links from the intermediate link pivoted to said adjacent links, said plate having a laterally offset bottom portion concavely curved to interfit closely with the convexly curved end portions of adjacent links.

2. A fabric-embossing chain comprising flat sheet metal links pivoted together at their ends, and having end portions convexly curved concentrically with the adjacent pivot axis, said links being laterally staggered such that alternate links are coplanar, and elements intermediate the ends of alternate links concavely formed and closely fitting said end portions, the radius of curvature of said end portions and said elements being such that the curved, interfitting surfaces intersect the bottom of said links at a substantial angle, the bottom surface of said links being concavely curved so as to interfit closely with a roll of relatively large diameter.

3. A fabric-embossing chain comprising sheet metal links pivoted together at their ends, and having end portions convexly curved concentrically with the adjacent pivot axis, said links being laterally staggered such that alternate links are coplanar, adjacent links having reversely bent intermediate portions at opposite sides thereof, said portions each being coplanar with the adjacent links.

4. A fabric-embossing chain comprising sheet metal links pivoted together at their ends, and having end portions convexly curved concentrically with the adjacent pivot axis, said links being laterally staggered such that alternate links are coplanar, adjacent links having reversely bent intermediate portions at opposite sides thereof, said portions each being coplanar with the adjacent links, said reversely bent portions having concavely shaped ends concentric with said pivot axes and adapted to interfit closely with the convexly curved ends of adjacent links so as to provide a continuous flexible structure of uniform width.

5. A fabric-embossing chain comprising sheet metal links pivoted together at their ends, and having end portions convexly curved concentrically with the adjacent pivot axis, said links being laterally staggered such that alternate links are coplanar, adjacent links having reversely bent intermediate portions at opposite sides thereof, said portions each being coplanar with the adjacent links, said reversely bent portions having concavely shaped ends concentric with said pivot axes and adapted to interfit closely with the convexly curved ends of adjacent links so as to provide a continuous flexible structure of uniform width, said convexly curved end portions and said concavely shaped ends having a radius of curvature such that their curved surfaces intersect the bottom of said chain at substantial angles.

6. A fabric-embossing chain comprising sheet metal links pivoted together at their ends, and having end portions convexly curved concentrically with the adjacent pivot axis, said links being laterally staggered such that alternate links are coplanar, adjacent links having reversely bent intermediate portions at opposite sides thereof, said portions each being coplanar with the adjacent links, said reversely bent portions having concavely shaped ends concentric with said pivot axes and adapted to interfit closely with the convexly curved ends of adjacent links so as to provide a continuous flexible structure of uniform width, the bottom surface of said reversely bent portions having the same shape as the bottom surface of said links so that said links have a smooth surfaced bottom having twice the width centrally as at the ends thereof.

7. In a fabric-embossing chain adapted to present a smooth surface of constant width to a smooth cylindrical roll, a link formed of sheet metal having a concave bottom surface of the same radius of curvature as the roll, the ends of said links having pivot openings and being convexly curved coaxial with said pivot openings, said link having a central portion reversely bent upwardly from the bottom of said link and lying against the side of said link, the ends of said reversely bent portion being concavely curved coaxially with said pivot openings on the same radius of curvature as said convexly curved ends, the bottom of said reversely bent portion being concavely curved to the radius of curvature of the roll, and having a square outer corner.

CLARENCE J. DAVIES.